United States Patent
Ettl et al.

(10) Patent No.: US 7,662,871 B2
(45) Date of Patent: Feb. 16, 2010

(54) AQUEOUS POLYMER DISPERSIONS, BASED ON COPOLYMERS OF VINYL AROMATICS AND BUTADIENE, METHOD FOR THEIR PRODUCTION AND THEIR USE AS SIZING AGENTS FOR PAPER

(75) Inventors: Roland Ettl, Hassloch (DE); Christoph Hamers, Ludwigshafen (DE); Juergen Schmidt-Thuemmes, Neuhofen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 296 days.

(21) Appl. No.: 10/510,279

(22) PCT Filed: Apr. 15, 2003

(86) PCT No.: PCT/EP03/03898

§ 371 (c)(1),
(2), (4) Date: Oct. 6, 2004

(87) PCT Pub. No.: WO03/091300

PCT Pub. Date: Nov. 6, 2003

(65) Prior Publication Data

US 2005/0176878 A1   Aug. 11, 2005

(30) Foreign Application Priority Data

Apr. 24, 2002 (DE) ................. 102 18 418

(51) Int. Cl.
*C08L 3/00* (2006.01)
(52) U.S. Cl. .......................... 524/47; 524/52
(58) Field of Classification Search .......... 524/47, 524/52
See application file for complete search history.

(56) References Cited

U.S. PATENT DOCUMENTS

| 4,003,871 A | | 1/1977 | Costanza et al. |
| 4,041,227 A | | 8/1977 | Uraneck et al. |
| 5,147,907 A | * | 9/1992 | Rinck et al. .................. 524/48 |
| 6,489,382 B1 | * | 12/2002 | Giesecke et al. .............. 524/89 |
| 2004/0242766 A1 | * | 12/2004 | Gaschler et al. ............. 524/800 |

FOREIGN PATENT DOCUMENTS

| DE | 198 53 489 | 5/2000 |
| EP | 0 257 412 | 3/1988 |
| EP | 0 276 770 | 8/1988 |
| EP | 0 307 816 | 3/1989 |
| EP | 0 408 099 | 1/1991 |
| EP | 0 735 065 | 10/1996 |
| JP | 58-115196 | 8/1983 |

* cited by examiner

*Primary Examiner*—Peter D Mulcahy
(74) *Attorney, Agent, or Firm*—Oblon, Spivak, McClelland, Maier & Neustadt, L.L.P.

(57) ABSTRACT

Aqueous polymer dispersions which are obtainable by free radical copolymerization of
(a) from 0.1 to 99.9% by weight of styrene and/or methylstyrene,
(b) 0.1-99.9% by weight of 1,3-butadiene and/or isoprene and
(c) from 0 to 40% by weight of other ethylenically unsaturated copolymerizable monomers, the sum of the monomers (a), (b) and (c) always being 100,
in the presence of from 10 to 40% by weight, based on the monomers used, of at least one degraded starch having a molecular weight Mn of from 500 to 40 000 and of water-soluble redox catalysts are prepared by free radical copolymerization of the monomers (a), (b) and, if required, (c) in an aqueous medium in the presence of a degraded starch having a molecular weight Mn of from 500 to 10 000 and redox initiators and are used as engine sizes and surface sizes for paper.

5 Claims, No Drawings

AQUEOUS POLYMER DISPERSIONS, BASED ON COPOLYMERS OF VINYL AROMATICS AND BUTADIENE, METHOD FOR THEIR PRODUCTION AND THEIR USE AS SIZING AGENTS FOR PAPER

The present invention relates to aqueous polymer dispersions based on copolymers of vinylaromatics and butadiene, processes for their preparation and their use as engine sizes and surface sizes for paper.

The use of aqueous polymer dispersions as sizes and as coating materials for paper is known. The use of starch and/or starch derivatives for stabilizing the polymer particles of such sizes is also described in the literature. For example, JP-A-58/115,196 describes the preparation of graft copolymers which are obtainable by polymerizing 5-85% by weight of styrene and 2-50% by weight of (meth)acrylates in the presence of water-soluble polymers, such as starch. The aqueous dispersions which can thus be prepared are used as sizes for paper.

EP-A-0 257 412 discloses sizes for paper which are obtainable by polymerizing a monomer mixture of 20-65% by weight of acrylonitrile, 80-35% by weight of at least one acrylate and 0-10% by weight of other ethylenically unsaturated monomers in the aqueous phase in the presence of a degraded starch having a reduced viscosity of 0.12-0.5 dl/g and redox initiators.

According to EP-A-0 276 770, sizes based on copolymers of acrylonitrile and acrylates are prepared by polymerizing the monomers in an aqueous medium in the presence of a degraded starch having a reduced viscosity of from 0.04 to less than 0.12 dl/g and of redox catalysts.

EP-A-0 307 816 discloses a process for improving the printability of paper, an aqueous coating material comprising a pigment and a cationic aqueous polymer dispersion of a paper size and of a surface-active substance interfering with the formation of the surface size and/or of a polymeric dispersant being applied to one or both surfaces of the paper.

EP-A-0 735 065 describes the preparation of an amphoteric polymer dispersion by a two-stage polymerization. In the first stage, ethylenically unsaturated monomers and up to 30% by weight of unsaturated carboxylic, sulfonic or phosphonic acids are polymerized in the presence of enzymatically or hydrolytically degraded starch and/or starch derivatives. In a second stage, further ethylenically unsaturated monomers and up to 35% by weight of cationic monomers are polymerized.

DE-A-198 53 489 relates to the use of aqueous styrene/butadiene dispersions which are prepared by free radical polymerization of styrene and butadiene in the presence of protective colloids, such as polyvinyl alcohol or water-soluble polysaccharides, in construction adhesive formulations.

It is an object of the present invention to provide novel substances which are suitable, for example, for the engine sizing and surface sizing of paper.

We have found that this object is achieved, according to the invention, by aqueous polymer dispersions based on copolymers of vinylaromatics and butadiene, which are obtainable by free radical copolymerization of
(a) from 0.1 to 99.9% by weight of styrene and/or methylstyrene,
(b) 0.1-99.9% by weight of 1,3-butadiene and/or isoprene and
(c) from 0 to 40% by weight of other ethylenically unsaturated copolymerizable monomers, the sum of the monomers (a), (b) and (c) always being 100, in the presence of from 10 to 40% by weight, based on the monomers used, of at least one degraded starch having a molecular weight Mn of from 500 to 40 000 and of water-soluble redox catalysts.

The present invention also relates to a process for the preparation of aqueous copolymer dispersions based on vinylaromatics and butadiene by copolymerization of vinylaromatics and butadiene in an aqueous medium in the presence of starch and water-soluble redox catalysts, wherein
(a) from 0.1 to 99.9% by weight of styrene and/or methylstyrene,
(b) 0.1-99.9% by weight of 1,3-butadiene and/or isoprene and
(c) from 0 to 40% by weight of other ethylenically unsaturated copolymerizable monomers are used in the copolymerization, the sum of the monomers (a), (b) and (c) always being 100, and the copolymerization is carried out in the presence of from 10 to 40% by weight, based on the monomers used, of at least one degraded starch having a molecular weight Mn of from 500 to 40 000.

In the novel process, a monomer mixture comprising
(a) from 50 to 99% by weight of styrene and/or methylstyrene,
(b) from 1 to 50% by weight of butadiene and/or isoprene and
(c) from 0 to 40% by weight of other ethylenically unsaturated copolymerizable monomers is preferably polymerized in an aqueous solution of an enzymatically degraded natural starch with a redox catalyst comprising hydrogen peroxide and heavy metal ions from the group consisting of the cerium, manganese and iron(II) salts.

The present invention also relates to the use of the above-described aqueous polymer dispersions as engine sizes and/or surface sizes for paper, board and cardboard.

Suitable monomers of group (a) are, for example, styrene and substituted styrenes, such as α-methylstyrene, and mixtures of said monomers. The monomer mixture used in the polymerization contains the vinylaromatics of group (a) preferably in an amount of from 50.0 to 99.9, in particular from 75 to 99, % by weight. A vinylaromatic preferably used in the copolymerization is styrene.

Suitable monomers of group (b) are 1,3-butadiene and substituted butadienes, such as 2-chlorobutadiene, or mixtures thereof. The monomers of group (b) are contained in the monomer mixture preferably in an amount of from 0.1 to 50, particularly preferably from 1 to 25, % by weight.

Suitable monomers of group (c) are anionic, cationic and/or nonionic hydrophilic ethylenically unsaturated monomers. Examples of anionic monomers are: acrylic acid, methacrylic acid, ethacrylic acid, crotonic acid, vinylacetic acid, itaconic acid, styrenesulfonic acid, acrylamido-2-methylpropanesulfonic acid, vinyl sulfonate, vinylphosphonic acid and/or maleic acid and their monoesters and the alkali metal and ammonium salts of these monomers. Mixtures of these monomers may also be used in the copolymerization.

The suitable monomers (c) are preferably water-soluble. They have, for example, a solubility of at least 50 g/l of water at 20° C. Suitable monomers (c) are, for example, acrylamide, methacrylamide, N-vinylformamide, N-vinylacetamide, N-vinylpyrrolidone, N-vinyloxazolidone, methylpolyglycol acrylates and methylpolyglycol methacrylates.

Suitable cationic monomers are, for example, dialkylaminoalkylacrylamides, dialkylaminoalkyl acrylates and/or dialkylaminoalkylmethacrylamides and/or dialkylaminoalkyl methacrylates. Examples of these are esters of ethylenically unsaturated carboxylic acids with amino alcohols, such as dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminobutyl acrylate and diethylaminobutyl acrylate. The basic acrylates can be used in the form of the free bases, of the salts with mineral acids, such as hydrochloric acid, sulfuric acid and nitric acid, of the salts with organic acids, such as formic acid, acetic acid or propionic acid, or of sulfonic acids or in quaternized form. Suitable quaternizing agents are, for example, dimethyl sulfate, diethyl sulfate, methyl chloride, ethyl chloride and benzyl chloride.

Further suitable comonomers are amides of ethylenically unsaturated carboxylic acids, such as acrylamide, methacrylamide and N-alkylmono- and diamides of monoethylenically unsaturated carboxylic acids having alkyl radicals of 1 to 6 carbon atoms, e.g. N-methylacrylamide, N,N-dimethylacrylamide, N-methylmethacrylamide, N-ethylacrylamide, N-propylacrylamide and tert-butylacrylamide, and basic (meth)acrylamides, such as dimethylaminoethylacrylamide, dimethylaminoethylmethacrylamide, diethylaminoethylacrylamide and diethylaminoethylmethacrylamide, dimethylaminopropylacrylamide, diethylaminopropylacrylamide, dimethylaminopropylmethacrylamide and diethylaminopropylmethacrylamide.

Further suitable comonomers (c) are N-vinylimidazole and substituted N-vinylimidazoles, such as N-vinyl-2-methylimidazole, N-vinyl-4-methylimidazole, N-vinyl-5-methylimidazole and N-vinyl-2-ethylimidazole, and N-vinylimidazolines, such as N-vinylimidazoline, N-vinyl-2-methylimidazoline and N-vinyl-2-ethylimidazoline. N-Vinylimidazoles and N-vinylimidazolines are used not only in the form of the free bases but also in a form neutralized with mineral acids or organic acids or in quaternized form, the quaternization preferably being carried out with dimethyl sulfate, diethyl sulfate, methyl chloride or benzyl chloride.

The following are furthermore suitable as comonomers:
N-trimethylammoniumethylacrylamide chloride,
N-trimethylammoniumethylmethacrylamide chloride,
N-trimethylammoniumethyl methacrylate chloride,
N-trimethylammoniumethyl acrylate chloride,
trimethylammoniumethylacrylamide methosulfate,
trimethylammoniumethylmethacrylamide methosulfate,
N-ethyldimethylammoniummethylacrylamide ethosulfate,
N-ethyldimethylammoniumethylmethacrylamide ethosulfate,
trimethylammoniumpropylacrylamide chloride,
trimethylammoniumpropylmethacrylamide,
trimethylammoniumpropylacrylamide methosulfate,
trimethylammoniumpropylmethacrylamide methosulfate and
N-ethyldimethylammoniumpropylacrylamide ethosulfate.

Preferably used monomers of group (c) are acrylic acid, methacrylic acid, maleic acid, N-vinylformamide, acrylates and methacrylates and vinyl acetate.

For example, natural starches, such as potato, wheat, corn, rice or tapioca starch, are suitable as starch, potato starch being preferred. Starches containing at least 80% of amylopectin are preferred. Chemically modified starches, such as hydroxyethyl- or hydroxypropyl-starches, or starches containing anionic groups, e.g. phosphate starch, or cationic starches which have quaternary ammonium groups may also be used.

The starch to be used according to the invention is obtained by subjecting said starch types to oxidative, thermal, acidic or enzymatic degradation. However, the starch can also be subjected to a combined degradation, for example a hydrolytic and an oxidative degradation. In order to establish the desired molecular weight of the starch, it is preferably enzymatically degraded. Starch degradation with termamyl, as usually carried out when improving the solubility properties of the starch, and a further degradation, for example with hydrogen peroxide, which can be carried out, for example, shortly before the subsequent graft copolymerization, are particularly preferred. In this case, hydrogen peroxide (calculated as 100%) in concentrations of, for example, from 0.3 to 5.0% by weight, based on starch used, is used. The amount of hydrogen peroxide depends on the molecular weight to which the starch is to be degraded in each case.

The starches degraded in this manner have an average molecular weight Mn of from 500 to 40 000, preferably from 500 to 10 000, with the result that, on the one hand, good dispersing of the emulsion polymers is ensured and, on the other hand, precipitation of the polymerization batch is avoided. The average molecular weight of the degraded starch can readily be determined with the aid of known gel chromatographic analysis methods after calibration, for example with dextran standards. Viscosimetric methods, as described, for example, in Methods in Carbohydrate Chemistry, Volume IV, Academic Press New York and Frankfurt, 1964, page 127, are also suitable for the characterization. The intrinsic viscosity of the degraded starches which is determined in this manner is preferably from 0.05 to 0.12 dl/g.

The polymerization of the monomers (a), (b) and, if required, (c) is carried out, as a rule, by adding both the monomers, either individually or as a mixture, and the redox initiator suitable for initiating the polymerization to the aqueous solution of degraded starch.

In order to increase the dispersing effect, low molecular weight anionic or nonionic emulsifiers, such as sodium alkanesulfonate, sodium dodecylsulfate, sodium dodecylbenzenesulfonate, sulfosuccinic esters, fatty alcohol polyglycol ethers, alkylaryl polyglycol ethers, etc., can be added to the polymerization batch. As a rule, however, such emulsifiers result in a poorer sizing effect of the polymer dispersions and generally lead to undesirable frothing during the handling of the dispersions. The polymerization is therefore preferably carried out in the absence of an emulsifier.

However, polymeric anionic emulsifiers which contain sulfo groups, for example based on maleic anhydride copolymers, are suitable.

The polymerization is usually carried out in the absence of oxygen, preferably in an inert gas atmosphere, for example under nitrogen. During the polymerization, thorough mixing with the aid of a suitable stirrer should be ensured.

The polymerization can be carried out both by the feed method and by a batch method, for example at from 30 to 100° C., preferably from 70 to 95° C.

In the feed method, which is preferable for obtaining a finely divided dispersion, the monomers and the free radical initiator are metered simultaneously into the starch solution in a stirred kettle. In order to obtain particular effects, a nonuniform or staggered addition of individual components may also be effected. The reaction times are, for example, from 0.5 to 10, preferably from 0.75 to 4, hours.

Graft-linking water-soluble redox systems are suitable for initiating the polymerization. For example, conventional water-soluble initiators, such as potassium peroxodisulfate, sodium peroxodisulfate, ammonium peroxodisulfate, hydrogen peroxide, etc., can be used together with at least one conventional reducing agent, such as sodium sulfite, sodium disulfite, sodium hydrogen sulfite, sodium dithionite, ascorbic acid or the sodium salt of hydroxymethanesulfonic acid, etc., as a redox system. Such redox systems lead in most cases to coarser-particled dispersions.

Particularly suitable redox catalysts having high grafting activity are water-soluble initiator systems, such as redox systems comprising hydrogen peroxide and heavy metal ions, such as cerium, manganese or iron(II) salts, as described, for example, in Houben-Weyl, Methoden der organischen Chemie 4th edition, Volume E20, page 2168. The redox system comprising hydrogen peroxide and an iron(II) salt, such as iron(II) sulfate, is particularly suitable and gives finely divided dispersions having a high grafting yield. The grafting yield is understood as meaning the proportion of the polymer which is chemically coupled to the starch after the end of the polymerization. The grafting yield should be as high as possible in order to obtain finely divided and highly effective dispersions.

The polymerization is usually carried out by adding the heavy metal salt of the redox system, for example the iron(II) salt, to the batch before the polymerization, while hydrogen peroxide is metered in simultaneously with the monomers but separately therefrom. Iron(II) salt is usually used in concentrations of from 10 to 200 mg/l of $Fe^{++}$ ion, based on the total dispersion, higher and lower concentrations also being possible. Hydrogen peroxide (calculated as 100%) is added in amounts of, for example, from 0.2 to 6.0% by weight, based on the monomer. This amount is in addition to the amount of hydrogen peroxide which is used for the starch degradation.

In addition to the redox initiators, conventional initiators, such as oil-soluble or only slightly water-soluble organic peroxides or azo initiators, may be concomitantly used. In particular, the addition of further reducing agents, which are preferably initially taken with the iron salt before the polymerization, has advantages. Examples of suitable reducing agents are sodium sulfite, sodium disulfite, sodium hydrogen sulfite, sodium dithionite, ascorbic acid and the sodium salt of hydroxymethanesulfonic acid.

The molecular weight of the grafted-on polymer may additionally be established by the concomitant use of chain-transfer agents or regulators, such as n-dodecyl mercaptan, tert-dodecyl mercaptan, n-butyl mercaptan or tert-butyl mercaptan. Odorless regulators, such as terpinolines, are particularly suitable (cf. EP-A-1191044).

The polymerization is carried out in general at a pH of from 2.5 to 9, preferably in the weakly acidic range at a pH of from 3 to 5.5. The pH can be brought to the desired value before or during the polymerization using conventional acids, such as hydrochloric acid, sulfuric acid or acetic acid, or using bases, such as sodium hydroxide solution, potassium hydroxide solution, ammonia, ammonium carbonate, etc. It is preferable to bring the pH of the aqueous polymer dispersions to from 5 to 7 after the polymerization by adding sodium hydroxide solution, potassium hydroxide solution or ammonia.

The concentration of the novel dispersions is, for example, from 10 to 40, preferably from 18 to 40, % by weight. A 25% strength aqueous polymer dispersion has, for example, a viscosity of from 3 to 300 mPa·s.

The novel dispersions have a very small particle size; for example, it is below 120 nm. The mean particle size of the dispersed polymer particles is preferably from 50 to 100 nm. The particle size can be determined, for example, by laser correlation spectroscopy or by turbidity measurement.

In order to increase the shelf life of the aqueous polymer dispersions, it is advantageous to bind the heavy metal ions used in the redox system, after the polymerization, by adding at least one complexing agent. For example, complexing agents such as ethylenediaminetetraacetic acid, nitrilotriacetic acid, diethylenetriaminepentaacetic acid, polyaspartic acid, iminosuccinic acid, citric acid or alkali metal or ammonium salts thereof are suitable for this purpose. The amount of complexing agents used depends on the amount of heavy metal salt which is to be complexed. Usually, the complexing agents are used in an amount of from 1 to 10, preferably from 1.1 to 5, mole per mol of heavy metal ion.

The novel polymer dispersions are preferably used as surface sizes but can also be employed as engine sizes. They generally have a weakly anionic charge character and only a slight tendency to frothing. They are suitable for the surface sizing of all paper qualities produced in practice, for example of alum-containing or alum-free papers, papers filled with kaolin or chalk and base papers which contain groundwood or waste paper and can be produced under either acidic or neutral or alkaline conditions and may be unsized or presized in the paper pulp, for example with alkylketene dimer or alkenylsuccinic anhydride.

The novel dispersions can be processed by all methods customary for surface sizing and can be applied to the surface of paper in the size press liquor. Use in aqueous solution together with 5 to 20% by weight of starch and, if required, pigments and optical brighteners in the size press or in modern application units, such as a film press, speedsizer or gateroll, is customary.

The amount of size in the liquor depends on the desired degree of sizing of the papers to be finished. Usually, the concentration of the novel dispersions in the liquor is from 0.1 to 2.0% by weight of solid substance, preferably from 0.2 to 1.0% by weight. The amount applied to the paper is determined by the wet absorption of the unsized or presized papers. Wet absorption is to be understood as meaning the amount of size press liquor which, based on the dry fiber, can be absorbed by the latter and which can be influenced, inter alia, by the presizing in the paper pulp. Depending on the wet absorption, the amount of the solvent absorbed by the paper is in most cases from 0.03 to 1.2% by weight of solid substance, based on dry fiber, preferably from 0.1 to 0.8% by weight.

The size press liquor may additionally contain finely divided pigments for improving the printability, for example chalk, precipitated calcium carbonate, kaolin, titanium dioxide, barium sulfate or gypsum. Furthermore, the addition of optical brighteners for increasing the whiteness, with or without the addition of carriers, e.g. polyethylene glycol, polyvinyl alcohol or polyvinylpyrrolidone, is customary during use on graphic arts papers. The good compatibility of the novel dispersions with optical brighteners is particularly advantageous, so that papers having high whiteness can be obtained.

Also particularly advantageous is the nonsensitivity of the novel dispersions to the addition of electrolytes, such as sodium, calcium or aluminum ions, which may be present in the size press liquor in many cases, for example through migration from the base paper to be processed, or may be deliberately added for increasing the conductivity.

The novel size dispersions are particularly suitable for the production of graphic arts papers which are used for all conventional modern printing processes. In inkjet printing, for example, high ink adsorptivity and rapid drying without strike-through are required together with good ink hold-out, maintenance of high ink density and high resolution as well as good smudge resistance and water resistance. In color printing, crisp edges are required, and the individual colored inks must not run into one another and should have high color strength, brilliance and lightfastness. These requirements can be met in an outstanding manner by the novel dispersions.

The use of the papers finished with the novel dispersions in electrophotographic printing processes, such as in laser printers and copiers, simultaneously requires good toner adhesion, i.e. the toner must adhere with high smudge resistance to the paper. This requirement, too, can be met in an outstanding manner by the use of the novel dispersions, in particular on papers presized, for example, with alkyldiketene.

In the examples which follow, parts and percentages are by weight, unless otherwise evident from the context.

EXAMPLES

Preparation of Novel Polymer Dispersions

Example 1

In a polymerization vessel equipped with a stirrer, reflux condenser, metering apparatuses and means for working under a nitrogen atmosphere, 9 kg of starch (Amylex 15 Südstärke) and 29.78 kg of water were initially taken and were heated to 85° C. in the course of 25 minutes while stirring. 0.12 kg of a 25% strength aqueous calcium acetate solution and 0.226 kg of a 0.015% strength commercial enzyme solution (α-amylase) were then added. After 30 minutes, the enzymatic starch degradation was stopped by adding 0.6 kg of 100% pure acetic acid. The molecular weight $M_n$ of the degraded starch was 6 000. 0.15 kg of a 10% strength aqueous iron(II) sulfate solution was then also added. The temperature of the reaction mixture was kept at 85° C. At this temperature, a mixture of 24.6 kg of styrene, 5.4 kg of 1,3-butadiene and 1.5 of tert-dodecyl mercaptan, 0.038 kg of a 40% strength aqueous emulsifier K 30 solution and 10.1 kg of water were then added in course of 120 minutes. Separately therefrom, 6 kg of a 15% strength hydrogen peroxide solution were added in the course of 30 minutes, and then 2 kg of a 15% strength hydrogen peroxide solution in the course of 105 minutes. 1 kg of a 10% strength aqueous tert-butyl hydroperoxide solution was then metered in at 60° C. in the course of 60 minutes. Thereafter, 0.225 kg of a 40% strength Trilon B solution and 1.2 kg of a 25% strength aqueous sodium hydroxide solution were added to the dispersion and the latter was then physically deodorized for 4 hours with 10 kg of steam per hour. An aqueous dispersion having a solids content of 40%, a light transmittance of 80 and a particle diameter of 114 nm was obtained.

Example 2

In a polymerization vessel equipped with a stirrer, reflux condenser, metering apparatuses and means for working under a nitrogen atmosphere, 9 kg of starch (Amylex 15 Südstärke) and 29.78 kg of water were initially taken and were heated to 85° C. in the course of 25 minutes while stirring. 0.12 kg of a 25% strength aqueous calcium acetate solution and 0.226 kg of a 0.21% strength commercial enzyme solution (α-amylase) were then added. After 30 minutes, the enzymatic starch degradation was stopped by adding 0.6 kg of 100% pure acetic acid. The molecular weight $M_n$ of the degraded starch was 6 000. 0.15 kg of a 10% strength aqueous iron(II) sulfate solution was then also added. The temperature of the reaction mixture was kept at 85° C. At this temperature, a mixture of 24.6 kg of styrene, 5.4 kg of butadiene and 0.6 kg of terpinolene, 0.038 kg of a 40% strength aqueous emulsifier K 30 solution and 10.1 kg of water were then added in course of 120 minutes. Separately therefrom, 6 kg of a 15% strength hydrogen peroxide solution were added in the course of 30 minutes, and then 2 kg of a 15% strength hydrogen peroxide solution in the course of 105 minutes. 1 kg of a 10% strength aqueous tert-butyl hydroperoxide solution was then metered in at 60° C. in the course of 60 minutes. Thereafter, 0.225 kg of a 40% strength Trilon B solution and 1.2 kg of a 25% strength aqueous sodium hydroxide solution were added to the dispersion and the latter was then physically deodorized for 4 hours with 10 kg of steam per hour. An aqueous dispersion having a solids content of 40%, a light transmittance of 94 and a particle diameter of 81 nm was obtained.

Comparative Example 1 (Example 1 of EP-A-0 735 065)

First Process Stage 500 parts of water were initially taken in a stirred double-jacket container having a blade stirrer, reflux condenser and $N_2$ feed line and 126 parts of potato starch acetate ester having a degree of substitution of 0.03 were added while stirring. Thereafter, 0.3 part of α-amylase LP was added and the mixture was heated to 80° C. and kept at this temperature for 2 hours. After the addition of 3 parts of sodium peroxodisulfate, dissolved in 15 parts of water, a mixture of 30 parts of styrene, 15 parts of n-butyl acrylate and 1 part of acrylic acid was metered in continuously over a period of 40 minutes. After the end of the feed, stirring was effected for a further 60 minutes at 80° C.

Second Process Stage 1 part of sodium hydroxymethanesulfinate, dissolved in 10 parts of water, was added at 80° C. to the dispersion obtained in the first process stage. Immediately thereafter, a mixture of 90 parts of styrene and 45 parts of n-butyl acrylate, a mixture of 16 parts of trimethylammoniumethyl methacrylate chloride in 14 parts of water and a mixture of 3 parts of hydrogen peroxide in 35 parts of water were metered in continuously over a period of 150 minutes, beginning at the same time but separately from one another. After the end of the metering, stirring was effected for 20 minutes at 85° C. and, after cooling, a coagulum-free polymer dispersion having a solids content of 33%, a pH of 5.5 and a mean particle size of 110 nm was obtained.

Comparative Example 2 (Example 3 of EP-A-0 735 065)

First Process Stage 500 parts of demineralized water were initially taken in a stirred 1 l double-jacket container having a blade stirrer, reflux condenser and $N_2$ feed line and 315 parts of an oxidatively degraded potato starch soluble at elevated temperatures were added while stirring. Thereafter, 0.3 part of α-amylase LP was added and the mixture was heated to 80° C. This temperature was maintained for 2 hours and then 3 parts of 37% strength formaldehyde solution were added. After the addition of a further 3 parts of sodium peroxodisulfate, a mixture of 15 parts of styrene, 30 parts of n-butyl acrylate and 2 parts of acrylic acid was metered in continuously in the course of 35 minutes. Polymerization was continued for a further hour.

Second Process Stage 1 part of sodium hydroxymethanesulfinate, dissolved in 10 parts of water, was added at 82° C. to the dispersion obtained in the first process stage. Immediately thereafter, a solution of 3 parts of hydrogen peroxide in 10 parts of water and a solution of 30 parts of trimethylammoniumethyl methacrylate chloride in 20 parts of water and a mixture of 90 g of styrene and 60 g of n-butyl acrylate were metered in continuously over a period of 120 minutes, beginning at the same time but separately from one another. Polymerization was continued for a further hour at this temperature and, after the addition of 9 parts of 20% strength sodium hydroxide solution, a coagulum-free dispersion was obtained.

Comparative Example 3 (Example 1) of EP-A-0 257 412)

31.8 g of an oxidatively degraded starch and 219 g of water were initially taken in a 1 l four-necked flask equipped with a stirrer, reflux condenser, metering apparatuses and means for working under a nitrogen atmosphere and were heated to 85° C. in the course of 30 minutes while stirring. 1 g of a 1% strength aqueous calcium acetate solution and 1.6 g of a 1% strength commercial enzyme solution (α-amylase) were then added. After 20 minutes, the enzymatic starch degradation was stopped by adding 4 g of glacial acetic acid. The intrinsic viscosity of the starch after this treatment was 0.21 dl/g. 7 g of a 1% strength aqueous iron(II) sulfate solution and 0.34 g of a 30% strength hydrogen peroxide were also added. The temperature of the reaction mixture was kept at 85° C. At this temperature, a mixture of 40 g of acrylonitrile and 33.5 g of n-butyl acrylate was then added in the course of 1 hour and, separately therefrom, 61 ml of a 0.7% strength hydrogen peroxide solution were then added, likewise in the course of one hour. After all the monomers had been metered in, polymerization was continued for a further hour at 85° C. A dispersion having a solids content of 26.3% was obtained. The light transmittance of the dispersion was 96%.

Comparative Example 4 (Example 2 of JP-A-58/115-196)

500 parts of a 6.6% strength aqueous solution of an oxidatively degraded potato starch were initially taken in a 2 l flask provided with a stirrer and a reflux condenser. The degraded starch had an intrinsic viscosity $\eta_i$ of 0.27 dl/g and a degree of substitution of 0.034 mol of carboxyl group per mole of glucose unit. 44 parts of styrene, 71.7 parts of n-butyl acrylate and 21.7 parts of tert-butyl acrylate as well as 3 parts of potassium peroxodisulfate in 50 parts of water were then added to the initially taken mixture heated to 80-90° C. An anionic polymer dispersion having a solids content of 25% and a light transmittance of 90 was obtained.

Comparative Example 5 (Cationic Dispersion 2 of EP-A-0 307 816)

20.7 parts of an 82% strength aqueous cationic potato starch ($\eta_i$=0.1 dl/g, degree of substitution 0.025 mol of nitrogen per mole of glucose unit) were dissolved in 133 parts by weight of water at 85° C. while stirring in a polymerization vessel equipped with a stirrer, metering apparatuses and a means for working under nitrogen. 3.7 parts of glacial acetic acid and 0.03 part of iron sulfate (FeSO$_4$.7H$_2$O) were added, followed by 0.8 part of 30% strength hydrogen peroxide and, after 20 minutes, 0.8 g of 30% strength hydrogen peroxide. An emulsion of 44 parts of n-butyl acrylate and 39 parts of styrene in a solution of 0.045 part of sodium laurylsulfate in 29 parts of water and, beginning simultaneously therewith, from a second feed vessel, 14 parts of a 5.5% strength hydrogen peroxide solution were then metered in the course of 2 hours. After the end of the monomer addition and the hydrogen peroxide addition, the reaction mixture was polymerized for a further hour at 85° C. A cationic dispersion having a solids content of 34% and a light transmittance of 86 was obtained.

The aqueous polymer dispersions prepared according to examples 1 and 2 and comparative examples 1 to 5 were tested with respect to their efficiency as surface sizes for paper. In each case, the Cobb value according to DIN 53132 and the ink flotation time according to DIN 53126 were determined.

The test paper used was a non-presized paper filled with PCC (precipitated calcium carbonate) and comprising 70% of birch sulfate and 30% of pine sulfate. In order to determine the surface sizing effect of the aqueous polymer dispersions prepared according to the examples and the comparative examples, said dispersions were each diluted to a polymer content of 2 g/l and applied with the aid of a size press to the test paper described above. The test papers were then dried and conditioned and were tested by the methods mentioned above. The values determined for the ink flotation time and the Cobb value are shown in the table. The lower the Cobb value and the longer the ink flotation time, the more efficient is the size:

| Size prepared according to | Cobb/g/m$^2$ | Ink flotation time/ min. |
|---|---|---|
| Example 1 | 27 | 35 |
| Example 2 | 33 | 35 |
| Comparative example 1 | 92 | 0 |
| Comparative example 2 | 106 | 0 |
| Comparative example 3 | 48 | 7 |
| Comparative example 4 | 40 | 12 |
| Comparative example 5 | 55 | 4 |

We claim:

1. An aqueous paper size composition, which comprises: dispersed polymer particles;
   at least one degraded starch having a molecular weight Mn of from 500 to 40,000;
   at least one water soluble catalyst; and
   at least one complexing agent;
   wherein
   the dispersed polymer particles comprise a copolymer consisting of
   (a) from 50 to 99% by weight of styrene and/or methylstyrene,
   (b) 1 to 50% by weight of 1,3-butadiene and/or isoprene and
   (c) from 0 to 40% by weight of other ethylenically unsaturated copolymerizable monomers, the sum of the monomers (a), (b) and (c) always being 100%,
   the copolymer is obtained by free radical copolymerization in the presence of from 10 to 40% by weight, based on the weight of monomers (a), (b) and (c), of the at least one degraded starch having a molecular weight Mn of from 500 to 40,000,
   the at least one water soluble redox catalyst comprises hydrogen peroxide and at least one heavy metal salt selected from the series consisting of cerium, manganese and iron(II) salts, and
   the mean particle size of the dispersed polymer particles is from 50 to 100 nm.

2. The paper size composition as claimed in claim 1, wherein the copolymer consists of(a) styrene and (b) 1,3-butadiene.

3. The paper size composition as claimed in claim 1, wherein a solids content is from 10 to 50%.

4. The paper size composition according to claim 1, wherein the complexing agent is at least one selected from the group consisting of ethylenediaminetetraacetic acid, nitrilotriacetic acid, diethylenetriaminepentaacetic acid, polyaspartic acid, iminodisuccinic acid, citric acid, a alkali metal salt thereof and an ammonium salt thereof.

5. The paper size composition according to claim 1, wherein an amount of complexing agent is in the range of from 1 to 10 mole per mole of heavy metal ion present.

* * * * *